(No Model.)

E. P. FARNUM.
Joint for Belting.

No. 236,675.

Patented Jan. 18, 1881.

Witnesses;
Chas. C. Lund
Walter B Hill

Inventor;
E. P. Farnum.

UNITED STATES PATENT OFFICE.

EDWARD P. FARNUM, OF CONCORD, NEW HAMPSHIRE.

JOINT FOR BELTING.

SPECIFICATION forming part of Letters Patent No. 236,675, dated January 18, 1881.

Application filed September 27, 1880. (No model.)

*To all whom it may concern:*

Be it known that I, EDWARD P. FARNUM, of Concord, in the county of Merrimack and State of New Hampshire, have invented certain Improvements in Joints for Belts, of which the following is a specification, reference being had to the accompanying drawings, which are made a part hereof.

Figure 1:
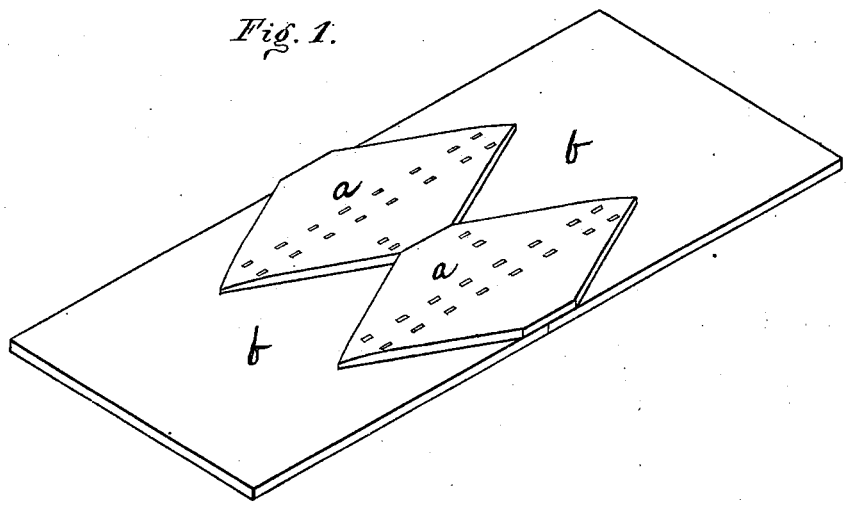
Figure 2:
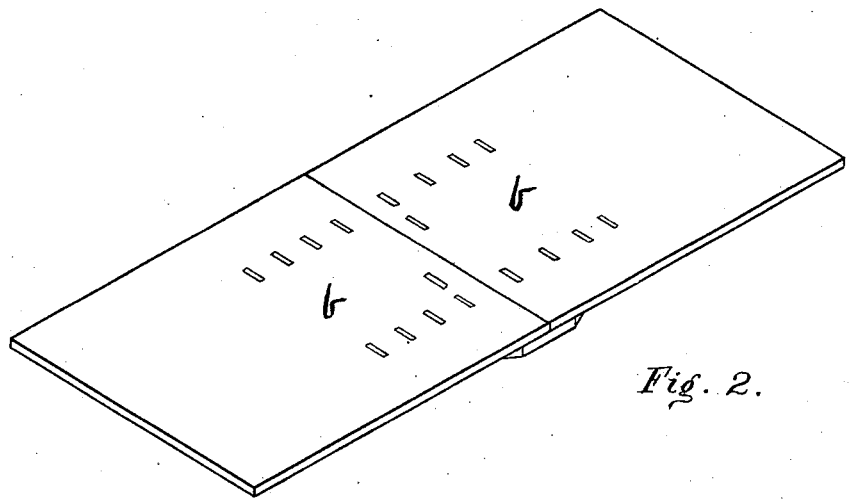

Figure 1 is a representation of the outer side of my belt at the joint. Fig. 2 represents the inner side of my belt, or the side next the pulley.

My improvement consists in placing diamond-shaped parallel leathern splices over the ends of the belt to be joined and securing them in place by means of pointed rivets or tacks, as shown. The two ends of the belt $b$ $b$ are cut off square and butted together. The splices $a$ $a$ are cut in the form shown in the drawings, which makes a joint more flexible than if it were made with a whole piece of leather, and also offers less obstruction to a riding pulley.

In forming the joint above referred to I make use of pointed tacks or nails, double or single, and a clincher of peculiar construction; but as these are described in Letters Patent already granted to me, it is not necessary to give a description of them here.

It will be seen that my joint is stronger and more flexible than could be obtained from the use of lacings, or by fastening the belt ends by a single piece of leather, or by riveting the ends previously matched by chamfering.

I claim—

The combination of the belt ends $b$ $b$ with the parallel diamond-shaped splices $a$ $a$, the splices being fastened to the belt ends by suitable pointed nails or tacks, substantially as set forth.

EDWARD P. FARNUM.

Witnesses:
   CHAS. C. LUND,
   WALTER B. HILL.